United States Patent

Henry et al.

[11] Patent Number: 6,134,573
[45] Date of Patent: Oct. 17, 2000

[54] APPARATUS AND METHOD FOR ABSOLUTE FLOATING POINT REGISTER ADDRESSING

[75] Inventors: G. Glenn Henry, Austin; Albert J. Loper, Jr., Cedar Park; Terry Parks, Austin, all of Tex.

[73] Assignee: IP-First, L.L.C., Fremont, Calif.

[21] Appl. No.: 09/063,282

[22] Filed: Apr. 20, 1998

[51] Int. Cl.[7] .................................................. G06F 9/30
[52] U.S. Cl. ........................................ 708/510; 712/211
[58] Field of Search ................................. 708/510, 495; 712/211, 221, 222

[56] References Cited

U.S. PATENT DOCUMENTS

| | | | |
|---|---|---|---|
| 4,812,989 | 3/1989 | Maier et al. | 712/211 |
| 4,961,162 | 10/1990 | Nguyenphu et al. | 708/510 |
| 5,070,475 | 12/1991 | Normoyle et al. | 712/211 |
| 5,121,351 | 6/1992 | Shirakawa et al. | 708/510 |
| 5,301,137 | 4/1994 | Matsuo et al. | 708/510 |
| 5,761,105 | 6/1998 | Goddard et al. | 708/510 |
| 5,813,045 | 9/1998 | Mahalingaiah et al. | 712/211 |
| 5,828,873 | 10/1998 | Lynch | 712/211 |

*Primary Examiner*—David H. Malzahn
*Attorney, Agent, or Firm*—Richard K. Huffman; James W. Huffman

[57] ABSTRACT

An apparatus and method for improving the execution of floating point instructions in a microprocessor is provided. During decode of a floating point instruction, translation logic generates absolute addresses of specified registers in a floating point register file. These absolute references, as opposed to relative references to a top-of-stack, are inserted into associated micro instructions. In the event of an exception, synchronization logic provides an architected top-of-stack for the floating point instruction associated with the exception to the translation logic so that subsequent instructions will properly reference floating point registers.

25 Claims, 6 Drawing Sheets

Conventional Floating Point Register Reference Conversion

| Cycle | TOS | Fetch | Translate | FP Register | FP Execute | FP Write Back |
|---|---|---|---|---|---|---|
| 1 | R0 | *** | *** | *** | *** | *** |
| 2 | R0 | FLD X | *** | *** | *** | *** |
| 3 | R0 | FLD Y | FLD X | *** | *** | *** |
| 4 | R7 | FCOMP ST(1) | FLD Y | FLD X | *** | *** |
| 5 | R7 | *** | -- | FLD X | -- | *** |
| 6 | R6 | *** | FCOMP ST(1) | FLD Y | FLD X | -- |
| 7 | R6 | *** | -- | FLD Y | -- | FLD X |
| 8 | R7 | *** | *** | FCOMP ST(1) | FLD Y | -- |
| 9 | R7 | *** | -- | FCOMP ST(1) | -- | FLD Y |
| 10 | R7 | *** | *** | -- | FCOMP ST(1) | -- |
| 11 | *** | *** | *** | *** | -- | FCOMP ST(1) |
| 12 | *** | *** | *** | *** | *** | -- |
| 13 | *** | *** | *** | *** | *** | *** |

6 CYCLES (spanning cycles 6–11)

*Absolute Floating Point Register Addressing*

| Cycle | PTOS | Fetch | Translate | FP Register | FP Execute | FP Write Back |
|---|---|---|---|---|---|---|
| 1 | R0 | *** | *** | *** | *** | *** |
| 2 | R0 | FLD X | *** | *** | *** | *** |
| 3 | R7 | FLD Y | FLD R7,X | *** | *** | *** |
| 4 | R6 | FCOMP ST(1) | FLD R6,Y | FLD R7,X | *** | *** |
| 5 | R7 | *** | FCOMP R6,R7 | FLD R6,Y | FLD R7,X | *** |
| 6 | *** | *** | *** | FCOMP R6,R7 | FLD R6,Y | FLD R7,X |
| 7 | *** | *** | *** | *** | FCOMP R6,R7 | FLD R6,Y |
| 8 | *** | *** | *** | *** | *** | FCOMP R6,R7 |
| 9 | *** | *** | *** | *** | *** | *** |

3 CYCLES

FIG. 6

APPARATUS AND METHOD FOR ABSOLUTE FLOATING POINT REGISTER ADDRESSING

BACKGROUND OF THE INVENTION

1. Field of the Invention

This invention relates in general to the field of instruction execution in computers, and more particularly to an apparatus and method for generating an absolute address of a floating point register during decode of a floating point instruction.

2. Description of the Related Art

Historically, floating point hardware and integer hardware have been set apart within microprocessor architecture. Early microprocessors exhibited this segregation in the extreme: their floating point hardware and integer hardware were on entirely different integrated circuits. Floating point instructions were provided to an integer microprocessor for instruction decode, which then provided decoded micro instructions to a floating point coprocessor. The floating point coprocessor performed the specified floating point operations and supplied its results back to the integer microprocessor.

Although advances in integrated circuit technology have allowed for incorporation of floating point hardware into the same physical device as the remainder of the microprocessor, this legacy of integer/floating point hardware segregation has been retained so that older software programs would be able to execute on a newer microprocessor.

In an x86-compatible microprocessor, floating point instructions execute on operands stored in a floating point register file. The register file is viewed as a stack structure. A mechanism in the floating point unit keeps track of a register known as the top-of-stack. All x86 floating point instructions specify their register operands relative to the top-of-stack register. For example, an addition instruction, FADD ST(1), implicitly specifies the location of a first operand as being at the top-of-stack register, ST(0), and a second operand as being at a second register, ST(1), displaced by one address from the top-of-stack.

While relative specification of floating point registers is useful from a programming aspect, real world register files require absolute register addresses in order to access specified locations. As a result, conventional microprocessors have an initial stage in their floating point unit that is dedicated to converting relative references to floating point registers into absolute register addresses. More specifically, macro instructions are provided to the microprocessor with relative operand addresses. These instructions are decoded into micro instruction sequences, also with relative operand addresses. The floating point unit receives these floating point micro instructions and converts the relative operand addresses into physical addresses prior to execution of the instructions. In terms of a microprocessor clock, this conversion requires from one to three additional cycles for each micro instruction that enters the floating point unit. These additional cycles in the floating point pipeline cause delay to the overall time required to execute a software program. For a program having many floating point instructions, the associated delay is even more pronounced.

Therefore, what is needed is an apparatus and method that generates absolute references for floating point registers during translation of floating point macro instructions into associated micro instructions. In addition, what is needed is an apparatus and method that eliminates the need to convert relative register references to absolute references in a floating point unit.

SUMMARY

To address the above-detailed deficiencies, it is an object of the present invention to provide an apparatus and method that translates a floating point macro instruction having relative references to registers in a floating point register file into associated floating point micro instructions having absolute register addresses.

Accordingly, in the attainment of the aforementioned object, it is a feature of the present invention to provide a microprocessor for executing a floating point macro instruction having relative references to registers within a floating point register file. The microprocessor includes translation logic and top-of-stack synchronization logic. The translation logic is configured to translate the floating point macro instruction into associated floating point micro instructions having absolute references to the registers within the floating point register file. The translation logic includes a pseudo top-of-stack generator and an offset converter. The pseudo top-of-stack generator generates an absolute reference to a top-of-stack register for each of the associated floating point micro instructions. The offset converter is coupled to the pseudo top-of-stack generator and computes a second absolute reference to a second register within the floating point register file. The top-of-stack synchronization logic is coupled to the translation logic and synchronizes the pseudo top-of-stack generator with an architected top-of-stack register.

An advantage of the present invention is that a floating point unit may immediately access specified registers upon receipt of a floating point micro instruction.

Another object of the present invention is to provide an apparatus and method that eliminates a relative-to-absolute reference conversion stage in a floating point unit.

In another aspect, it is a feature of the present invention to provide an apparatus within a pipeline microprocessor, for executing a floating point macro instruction having relative references to registers within a floating point register file. The apparatus has an instruction decoder, a floating point unit, and top-of-stack synchronization logic. The instruction decoder translates the floating point macro instruction into associated floating point micro instructions, where each of the associated floating point micro instructions has an absolute reference to a top-of-stack register within the floating point register file. The instruction decoder includes a pseudo top-of-stack generator and an offset converter. The pseudo top-of-stack generator generates the absolute reference to the top-of-stack register for the each of the associated floating point micro instructions. The offset converter is coupled to the pseudo top-of-stack generator and computes a second absolute reference to a second register within the floating point register file. The floating point unit is coupled to the instruction decoder. The floating point unit executes the each of the associated floating point micro instructions, and maintains an architected top-of-stack register for the each of the associated floating point micro instructions. The top-of-stack synchronization logic is coupled to the instruction decoder and the floating point unit. The top-of-stack synchronization logic synchronizes the pseudo top-of-stack generator with the architected top-of-stack register.

In yet another aspect, it is a feature of the present invention to provide a microprocessor for executing a floating point macro instruction that specifies operands in a floating point register file within registers prescribed relative to a floating point top-of-stack register. The microprocessor includes a translator that decodes the floating point macro instruction into associated floating point micro instructions. The translator includes a pseudo top-of-stack pointer. The pseudo top-of-stack pointer provides an absolute floating point top-of-stack address for a specific floating point micro instruction, the specific floating point micro instruction being one of the associated micro instructions. The translator specifies absolute addresses of the registers in the floating point register file within the associated floating point micro instructions.

In a further aspect, it is a feature of the present invention to provide a floating point micro instruction within a pipeline microprocessor that is generated in a translate stage of the pipeline microprocessor prior to transmission to a floating point unit. The floating point micro instruction has a micro opcode field, a top-of-stack field, and a second operand field. The micro opcode field directs the pipeline microprocessor to perform a specified floating point operation. The top-of-stack field is coupled to the micro opcode field and prescribes an absolute address of a top-of-stack register within a floating point register file. The second operand field is coupled to the top-of-stack field and prescribes a second absolute address of a second register within the floating point register file. The top-of-stack field and said second operand field are calculated within the translate stage from a floating point macro instruction that prescribes a floating point operation to be executed relative to a current top-of-stack register within the floating point register file.

In yet a further aspect, it is a feature of the present invention to provide a method for absolutely addressing registers in a floating point register file. The method includes, a) within a translator, generating an absolute address of a top-of-stack register in the floating point register file for a particular floating point macro instruction using a preceding absolute top-of-stack address and a stack displacement; b) if access to a second register in the floating point register file is required by the particular floating point macro instruction, generating a second absolute address of the second register using the absolute address of the top-of-stack register and an offset retrieved from the floating point macro instruction; c) decoding the floating point macro instruction into associated floating point micro instructions, to be executed by a floating point unit, and inserting the absolute addresses generated in a) and b) into those associated floating point micro instructions that require access to the registers; and d) executing the associated floating point micro instructions within the floating point unit, wherein, if one of the floating point micro instructions fails to properly execute, resetting a pseudo top-of-stack generator in the translator to the absolute address of the top-of-stack register corresponding to the one of the floating point micro instructions.

Another advantage of the present invention is that pipeline delays associated with floating point micro instructions are expunged from a floating point pipeline.

BRIEF DESCRIPTION OF THE DRAWINGS

These and other objects, features, and advantages of the present invention will become better understood with regard to the following description, and accompanying drawings where.

DETAILED DESCRIPTION

In light of the above background on relative specification of operands in floating point instructions, a specific example within a related art pipeline microprocessor will now be described which illustrates the delay problem associated with relative reference conversion, with reference to FIGS. 1 through 3. After the problem has been discussed, a detailed description of the present invention will be provided with reference to FIGS. 4 through 6. Use of the present invention eliminates the delay problem.

Figure 1:
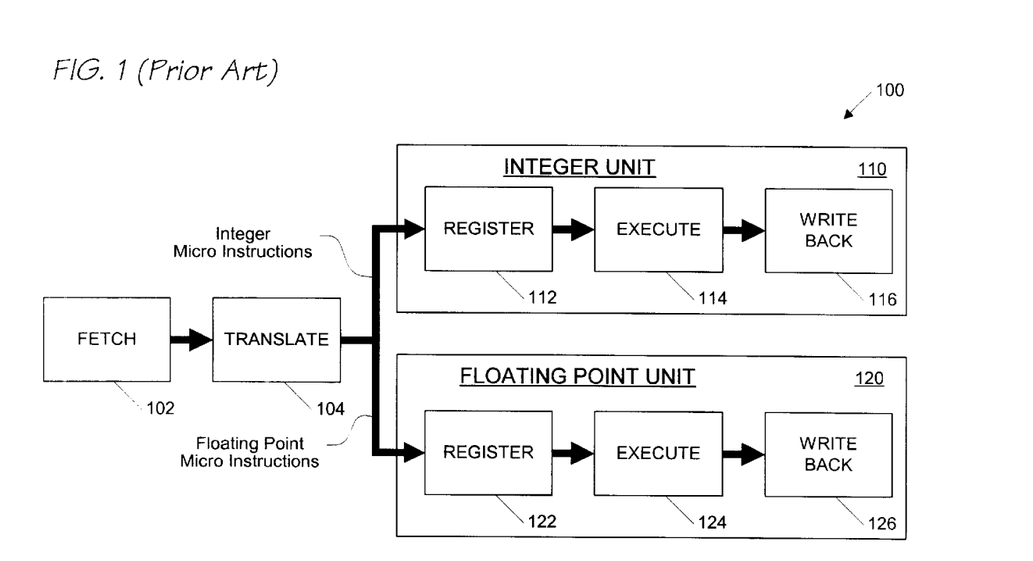
FIG. 1 is a block diagram illustrating processing stages within a related art pipeline microprocessor.

Referring to FIG. 1, a block diagram of a related art pipeline microprocessor 100 is presented. The microprocessor 100 includes a fetch stage 102, a translate stage 104, an integer unit 110, and a floating point unit 120. The floating point unit 120 is in parallel with the integer unit 110. The integer unit 110 has three stages: register 112, execute 114, and write back 116. The floating point unit 120 has three comparable stages: register 122, execute, 124, and write back 126.

Operationally, the fetch stage 102 fetches macro instructions from memory (not shown) that are to be executed by the microprocessor 100. The translate stage 104 translates, or decodes, a fetched macro instruction into associated micro instructions, each directing the microprocessor to perform a specific subtask related to accomplishment of an overall operation which is specified by the fetched macro instruction. Because of fundamental differences between operations involving integers and operations involving floating point numbers, microprocessor designers have historically segregated hardware and macro instructions for the performance of integer subtasks from that of floating point subtasks.

Thus, the translate stage 104 decodes a floating point macro instruction into a sequence of floating point micro instructions to accomplish a specified floating point operation. Comparably, the translate stage 104 decodes an integer macro instruction into a sequence of integer micro instructions to accomplish a specified integer operation. The integer micro instructions are passed from the translate stage 104 to the integer unit register stage 112. The integer unit register stage 112 retrieves operands specified by the integer micro instructions from a register file (not shown) for use by later stages in the integer pipeline. The integer unit execute stage 114 executes subtasks specified by the integer micro instructions. Examples of subtasks performed by the execute stage 114 include address calculation, integer arithmetic, and retrieval/storage of data from/to memory. The integer unit write back stage 116 writes results of the executed subtasks back into the register file.

Likewise, the floating point micro instructions are passed from the translate stage 104 to the floating point unit register stage 122. The floating point unit register stage 122 retrieves operands prescribed by the floating point micro instructions from a floating point register file (not shown), for use by later stages in the floating point pipeline. The floating point unit execute stage 124 executes floating point subtasks specified by the floating point micro instructions. Examples of subtasks performed by the floating point execute stage 124 include floating point arithmetic, square root, and transcendental functions (i.e., sine, cosine, etc.). The floating point unit write back stage 126 writes results of the executed subtasks back into the floating point register file.

Micro instructions move through successive stages of the microprocessor pipeline in synchronization with a microprocessor clock. Optimally, while any given stage in the pipeline is executing a micro instruction, the previous stage should be executing the next, or following, micro instruction. If a preceding micro instruction within one stage requires more than one cycle to completely execute, then following micro instructions are stalled until execution of the preceding micro instruction is completed. When a stall occurs, pipeline slips are inserted into the pipeline to insure that the following micro instructions do not prematurely advance in the pipeline.

Figure 2:
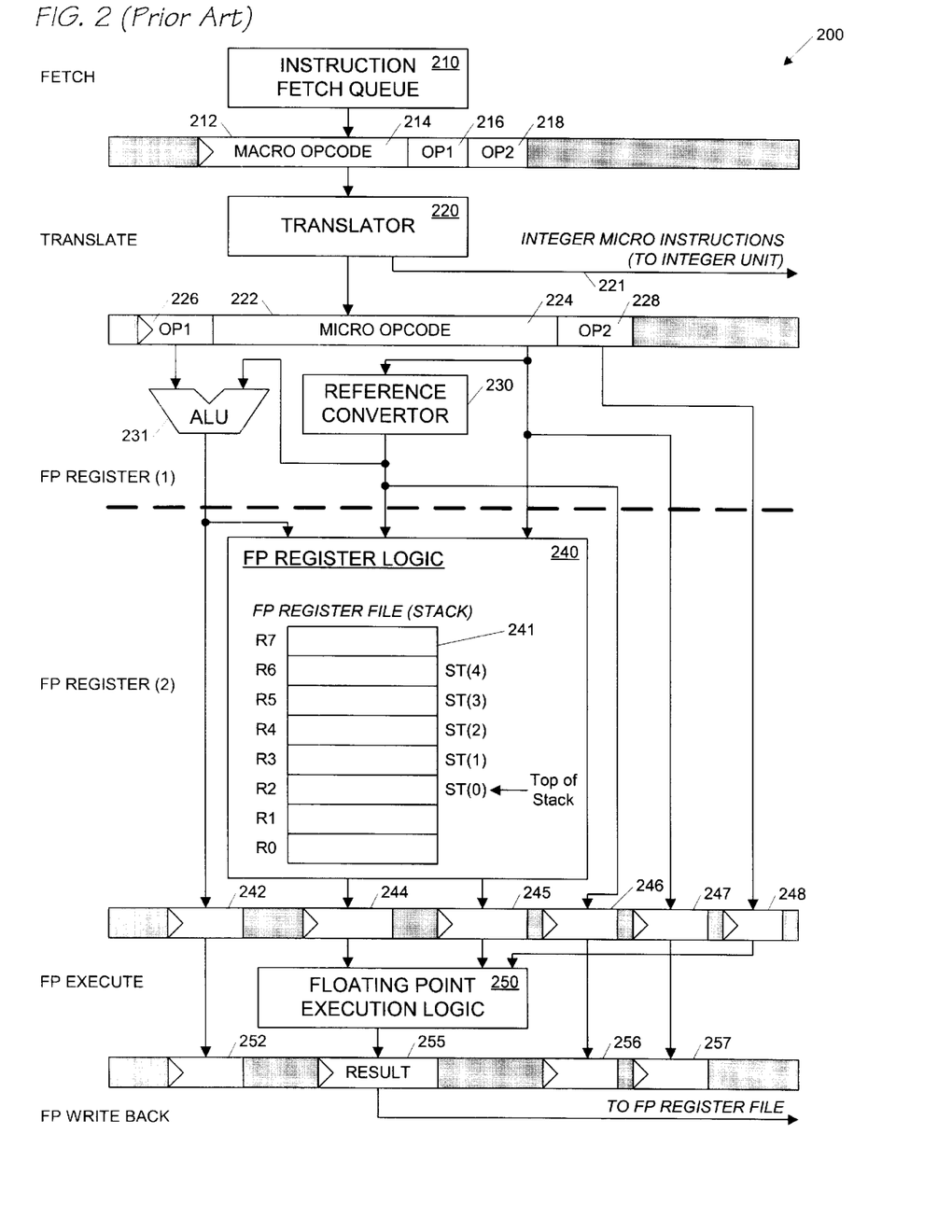
FIG. 2 is a block diagram of a portion of a related art microprocessor illustrating pipeline stages associated with execution of a floating point instruction.

Now referring to FIG. 2, a block diagram of a portion of a related art microprocessor 200 is presented illustrating pipeline stages associated with execution of a floating point instruction. For clarity, integer stages of the microprocessor 200 are not shown because they are not relevant to this discussion. The block diagram shows five pipeline stages associated with execution of the floating point instruction: fetch, translate, floating point register, floating point execute, and floating point write back. Although FIG. 2 depicts three stages assigned to the floating point unit of the microprocessor 200, a specific microprocessor may segregate its floating point unit differently into slightly more or less stages. One skilled in the art, nevertheless, will appreciate that the stages shown in FIG. 2 are representative of a typical microprocessor 200.

The fetch stage has an instruction fetch queue 210 connected to an instruction buffer 212. The translate stage has as translator 220 that provides an output to a micro instruction buffer 222.

The register stage is divided into two sub-stages: a first sub-stage includes a reference converter 230 connected to an ALU 231. Outputs of the reference converter 230 and the ALU 231 are provided, along with contents of the micro instruction buffer 222, to a second sub-stage of the floating point register stage: floating point register logic 240. Within the floating point register logic 240 is a floating point register file 241, which is also known as a floating point stack 241. Outputs of the floating point register file 241 are provided to first and second operand registers 244, 245. The floating point execute stage includes floating point execution logic 250, which receives inputs from the first and second operand registers 244, 245, along with inputs from an immediate register 248. The floating point execution logic 250 provides its output to a result register 255. The contents of the result register 255 are provided to the write back stage.

In operation, the instruction fetch queue 210 fetches macro instructions from memory (not shown) for execution by the microprocessor 200. The macro instructions are sequentially provided to the instruction buffer 212. The instruction buffer 212 has three fields: a macro opcode field 214, a first macro operand field 216, and a second macro operand field 218. In the case of a floating point macro instruction, the macro opcode field 214 directs the microprocessor 200 to perform a specified operation. Additionally, the macro opcode field 214 implicitly specifies a top-of-stack register in the floating point register file 241, which contains a first operand for the specified operation. The macro operand field 216 relatively specifies a second register in the floating point register file 241, relative to the top-of-stack register, which contains a second operand for the specified operation. The macro operand field 218 contains immediate data to be used in the specified operation.

One skilled in the art appreciates that an x86-compatible microprocessor 200 provides a set of floating point macro instructions that view the floating point register file 241 as a stack architecture, that is, all references to registers within the floating point register file 241 are prescribed relative to a register that is known as a current top-of-stack register. The floating point register file 241 in FIG. 2 has eight registers, designated R0 through R7. Register R2 is shown to be the current top-of-stack register, designated by ST(0). A relative reference in a floating point macro instruction to a next higher register, ST(1), would map to register R3, based upon the current top-of-stack register, R2. Offsets from the top-of-stack, ST(0), are prescribed in floating point macro instructions as ST(1), ST(2), and etc. For example, an x86 floating point macro instruction prescribing operands in ST(0) and ST(4), would access registers R2 and R6, respectively. Because of the historical segregation of floating point hardware from the remainder of the microprocessor 200, it is conventional for present day translators, even though they reside in the same chip as the floating point unit, to decode floating point macro instructions into associated floating point micro instructions having relative references to the current top-of-stack register.

Moreover, one skilled in the art will observe that the current top-of-stack register constantly changes as a function of floating point register file loads and retrievals. In an x86-compatible microprocessor 200, the top-of-stack designation decrements to a next lower register in the floating point register file 241 when a datum is loaded. More specifically, a floating point macro instruction specifying load of a data entity into ST(0) would first decrement the current top-of-stack to point to register R1. All subsequent references to ST(0) would then refer to register R1 until the top-of-stack designation is changed again.

Thus, floating point micro instructions are provided to the floating point unit of the microprocessor 200. All references to registers in the floating point register file 241 are specified relative to the current top-of-stack. But a typical floating point register file 241 in a present day microprocessor 200 requires absolute references to access its registers. More specifically, a physical address, R2, of the top-of-stack register in FIG. 2 must be used to access the register. Yet, because x86 floating point macro instructions specify operand registers relative to a changing top-of-stack designation, these relative references must first be converted to absolute references, i.e., physical addresses, so that the specified registers can be accessed.

As a result, the first floating point register sub-stage includes logic to accomplish the conversion of relative references to absolute references. The reference converter 230 maintains the top-of-stack designation. When a floating point micro instruction is retrieved from the micro instruction buffer 222, the reference converter 230 converts the relative reference to the top-of-stack register to an absolute reference. This absolute top-of-stack register reference is then provided to the floating point register logic 240 so that the current top-of-stack register can be accessed. In addition, the ALU 231 computes the absolute address of the second register by adding the current top-of-stack register to the offset retrieved from the first micro operand field 226. The absolute address of the second register is provided to the floating point logic 240 so that it can be accessed. The micro opcode is also retrieved from the micro opcode field 224 and provided to the floating point register logic 240.

Hence, the floating point logic 240 is provided with absolute references to the current top-of-stack register and the second register. If the micro opcode so directs, the contents of the top-of-stack register and the second register are retrieved and placed into the first and second operand registers 244, 245, respectively. Additionally, the micro opcode and the immediate data are forwarded to registers 247 and 248, respectively. Furthermore, the absolute reference to the top-of-stack register is provided to register 246 and the absolute reference to the second register is provided to register 242.

The floating point execute logic 250 retrieves the contents of register 244, the contents of register 245, and the immediate data from register 248. The floating point numerical operation directed by the micro opcode is then executed and a result is placed in the result register 255. In addition, the absolute reference to the top-of-stack register is forwarded to register 256, the micro opcode is forwarded to register 257, and the absolute reference to the second register is forwarded to register 252. Thus, the absolute references are provided to write back logic (not shown) so that the contents of the result register 255 can be written back to the proper register in the floating point register file 241.

One skilled in the art will accede that not all floating point macro instructions reference all of the operands and registers described above. Hence, a given floating point macro instruction may only deal with data in the top-of-stack register, and not prescribe a second register or immediate data.

The block diagram of FIG. 2 divides the floating point register stage into two sub-stages in order to emphasize that conversion of relative references to absolute register addresses is a procedure required to be performed on all floating point micro instructions that enter the floating point unit. The conversion procedure adds delay to the path through which all floating point micro instructions must traverse. The effects of the conversion process on the sequencing of several floating point micro instructions is more explicitly enumerated with reference to FIG. 3.

Figure 3:
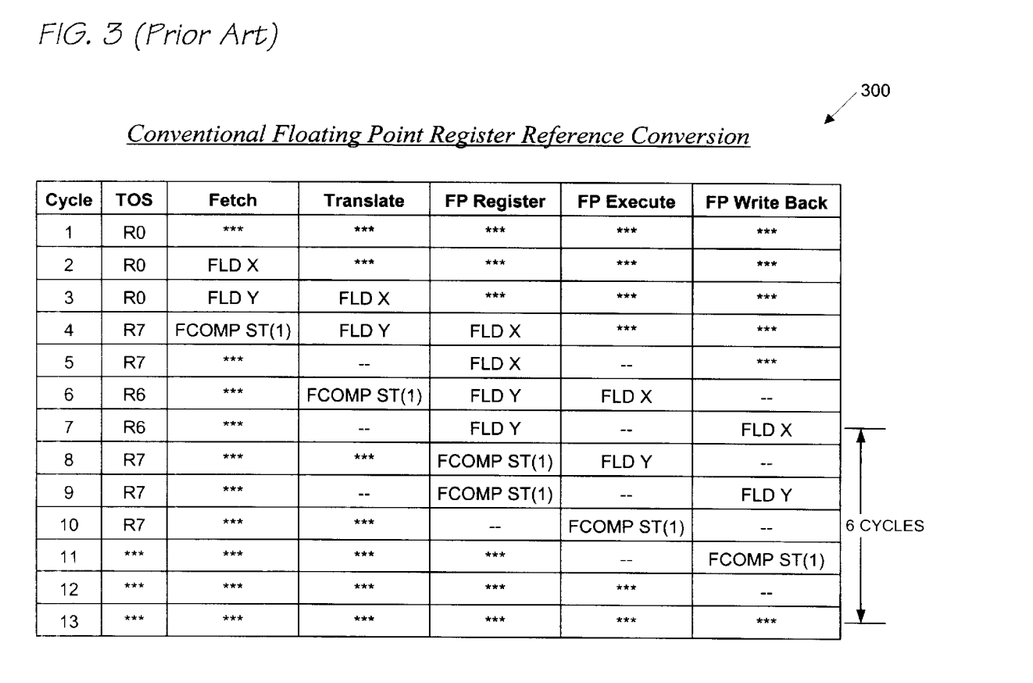
FIG. 3 is a table illustrating pipeline delays resulting from the execution of floating point instructions by the microprocessor of FIG. 2.

FIG. 3 is a table 300 illustrating pipeline delays resulting from the execution of three floating point macro instructions by the microprocessor of FIG. 2. A first floating point macro instruction is designated by FLD X. It directs the microprocessor 200 to load an immediate data entity, X, into the top-of-stack register, ST(0). Note that ST(0) is implicitly prescribed. A second floating point macro instruction is designated by FLD Y. It directs the microprocessor 200 to load a second immediate data entity, Y, into the top-of-stack register, ST(0). A third floating point macro instruction is designated by FCOMP ST(1). It directs the microprocessor 200 to compare the contents of ST(0) with the contents of ST(1), a second register, and to increment the top-of-stack register to the next higher register. Incrementing the top-of-stack register to the next higher register is also known as "popping" the stack. Note that ST(0) is also implicitly prescribed in the third floating point macro instruction. Progression of the three floating point micro instructions through the microprocessor 200 of FIG. 2 is shown with respect to cycles of a pipeline clock. Since the top-of-stack register designation is assigned for each instruction, the TOS column in the table 300 shows the current top-of-stack register during each cycle of the clock at the point of assignment in the reference converter 230. Instructions before and after instructions of interest are designated by "***." Voids, or slips in the pipeline are designated by "--."

During cycle 2, FLD X is provided by the instruction fetch queue 210 to the macro instruction buffer 212. The macro opcode, FLD, is placed in the macro opcode field 214 and the immediate data, X, is placed in the second macro operand field 218.

During cycle 3, FLD X proceeds through the translate stage. Therein, it is decoded into a first floating point load micro instruction, designated also by FLD X. Also during cycle 3, FLD Y is provided by the instruction fetch queue 210 to the macro instruction buffer 212.

During cycle 4, the first floating point load micro instruction, FLD X, is retrieved from the micro instruction buffer 222. The micro opcode, FLD, is retrieved from the micro opcode field 224 and is provided to the reference converter 230. Since it directs the microprocessor 200 to load data in the top-of-stack register, the reference converter 230 first decrements the top-of-stack register designation from R0 to R7. Thus, the top-of-stack register associated with FLD X is R7. With respect to FLD X, R7 is known as its architected top-of-stack register. Hence, the architected top-of-stack register, R7, associated with FLD X is placed in register 246 and is forwarded along with FLD X as it proceeds through the remaining stages of the pipeline. Also during cycle 4, the immediate data, X, is forwarded to register 248 and the micro opcode is forwarded to register 247. In addition, during cycle 4, FLD Y proceeds through the translate stage. Therein, it is decoded into a second floating point load micro instruction, designated also by FLD Y. Furthermore during cycle 3, FCOMP ST(1) is provided by the instruction fetch queue 210 to the macro instruction buffer 212.

During cycle 5, the first floating point micro instruction, FLD X, proceeds through the second sub-stage of the floating point register stage. Also during cycle 5, because FLD X is still in the floating point register stage, a void is seen in the execute stage because FLD X was unable to progress and a slip is inserted into the pipeline to prevent FLD Y from prematurely advancing in the pipeline. As a result, FLD Y is held in the micro instruction buffer 222 and FCOMP ST(1) is held in the macro instruction buffer 212.

During cycle 6, the void proceeds through the write back stage. Also during cycle 6, FLD X proceeds through the execute stage. Therein, the immediate data, X, is retrieved from register 248 and is provided to the floating point execution logic 250. Because a load operation is directed, the floating point execution logic 250 forwards the immediate data, X, to the result register 255. Contents of registers 246 and 247 are also forwarded to registers 256 and 257, respectively. In addition during cycle 6, the second floating point load micro instruction, FLD Y, proceeds through the first sub-stage of the floating point register stage. Since it directs the microprocessor 200 to load data in the top-of-stack register, the reference converter 230 first decrements the preceding top-of-stack register designation, R7, to a new current top-of-stack register designation, R6. Thus, the top-of-stack register associated with FLD Y is R6. With respect to FLD Y, R6 is known as its architected top-of-stack register. Hence, the architected top-of-stack register, R6, associated with FLD Y is placed in register 246 and is forwarded along with FLD Y as it proceeds through the remaining stages of the pipeline. Also during cycle 6, the immediate data, Y, is forwarded to register 248 and the micro opcode is forwarded to register 247. In addition, during cycle 6, FCOMP ST(1) proceeds through the translate stage.

Therein, it is decoded into a floating point compare-and-pop micro instruction, designated also by FCOMP ST(1).

During cycle 7, the immediate data, X, is retrieved from the result register 255 and is loaded into the architected top-of-stack register in the floating point register file 241. The micro opcode is retrieved from register 257. The absolute reference to register R7 is retrieved from register 256. Hence, X is written into its architected top-of-stack register, R7. Also during cycle 7, the second floating point load micro instruction, FLD Y, proceeds through the second sub-stage of the floating point register stage. In addition during cycle 7, because FLD Y is still in the floating point register stage, a second void is seen in the execute stage because FLD Y was unable to progress and a second slip is inserted into the pipeline to prevent FCOMP ST(1) from prematurely advancing in the pipeline. As a result, FCOMP ST(1) is held in the micro instruction buffer 222.

During cycle 8, the second void proceeds through the write back stage. In addition, FLD Y proceeds through the execute stage. Therein, the immediate data, Y, is retrieved from register 248 and is provided to the floating point execution logic 250. Because a load operation is directed, the floating point execution logic 250 forwards the immediate data, Y, to the result register 255. Contents of registers 246 and 247 are also forwarded to registers 256 and 257, respectively. In addition during cycle 8, the floating point compare-and-pop micro instruction, FCOMP ST(1), proceeds through the first sub-stage of the floating point register stage. Since it directs the microprocessor 200 to compare data in the top-of-stack register with data in a second register offset from the top-of-stack register, the reference converter 230 provides the preceding top-of-stack register, R6, to the floating point register logic 240 for retrieval of the operand. In addition, an absolute address of second register is computed by the ALU 231. The offset, 1, is retrieved from the first micro opcode field 226 and is summed with the top-of-stack, R6, yielding R7 as the absolute address of the second operand. In addition, since FCOMP ST(1) pops the stack at completion of proper execution, the reference converter 230 provides R7 as the architected top-of-stack for FCOMP ST(1). This architected top-of-stack, R7, is placed in register 246 and is forwarded along with FCOMP ST(1) as it proceeds through the remaining stages of the pipeline.

During cycle 9, the immediate data, Y, is retrieved from the result register 255 and is loaded into its associated architected top-of-stack register in the floating point register file 241. The micro opcode is retrieved from register 257. The absolute reference to register R6 is retrieved from register 257. Hence, Y is written into its architected top-of-stack register, R6. Also during cycle 9, FCOMP ST(1) proceeds through the second sub-stage of the floating point register stage. Therein, contents of registers R6 and R7 are retrieved and placed into first and second operand registers 244, 245. Because FCOMP ST(1) is still in the floating point register stage, a third void is seen in the execute stage because FCOMP ST(1) was unable to progress and a third slip is inserted into the pipeline to prevent the next instruction from prematurely advancing in the pipeline. Consequently, the next instruction is held in the micro instruction buffer 222.

During cycle 10, the second void proceeds through the write back stage. Also during cycle 10, FCOMP ST(1) proceeds through the execute stage. The contents of the first and second operand registers 244, 245 are provided to the floating point execution logic 250. A comparison operation causes certain bits in a flags register (not shown) in the microprocessor 200 to be affected. A description of such flags is beyond the scope of this discussion except to note that the compare operation yields no result in the result register 255 nor is any data written back into the floating point register file 241.

During cycle 11, FCOMP ST(1) proceeds through the write back stage. Also during cycle 10, the third void proceeds through the execute stage. During cycle 12, the third void proceeds through the write back stage.

As the table 300 illustrates, conversion of relative references to absolute addresses to access registers in a floating point register file adds at least an additional pipeline cycle for each floating point micro instruction that passes through the floating point pipeline. The three floating point instructions illustrated in FIG. 3 take six cycles to complete. This one-cycle delay for each floating point micro instruction can result in significant overall delays to the execution time of a software program; a program containing a great number of floating point instructions is especially impacted. One skilled in the art will agree that elimination of the reference conversion delay will remarkably improve the overall time required to execute a software program. The present invention addresses the issue of reference conversion in a manner which eliminates reference conversion delay.

Figure 4:
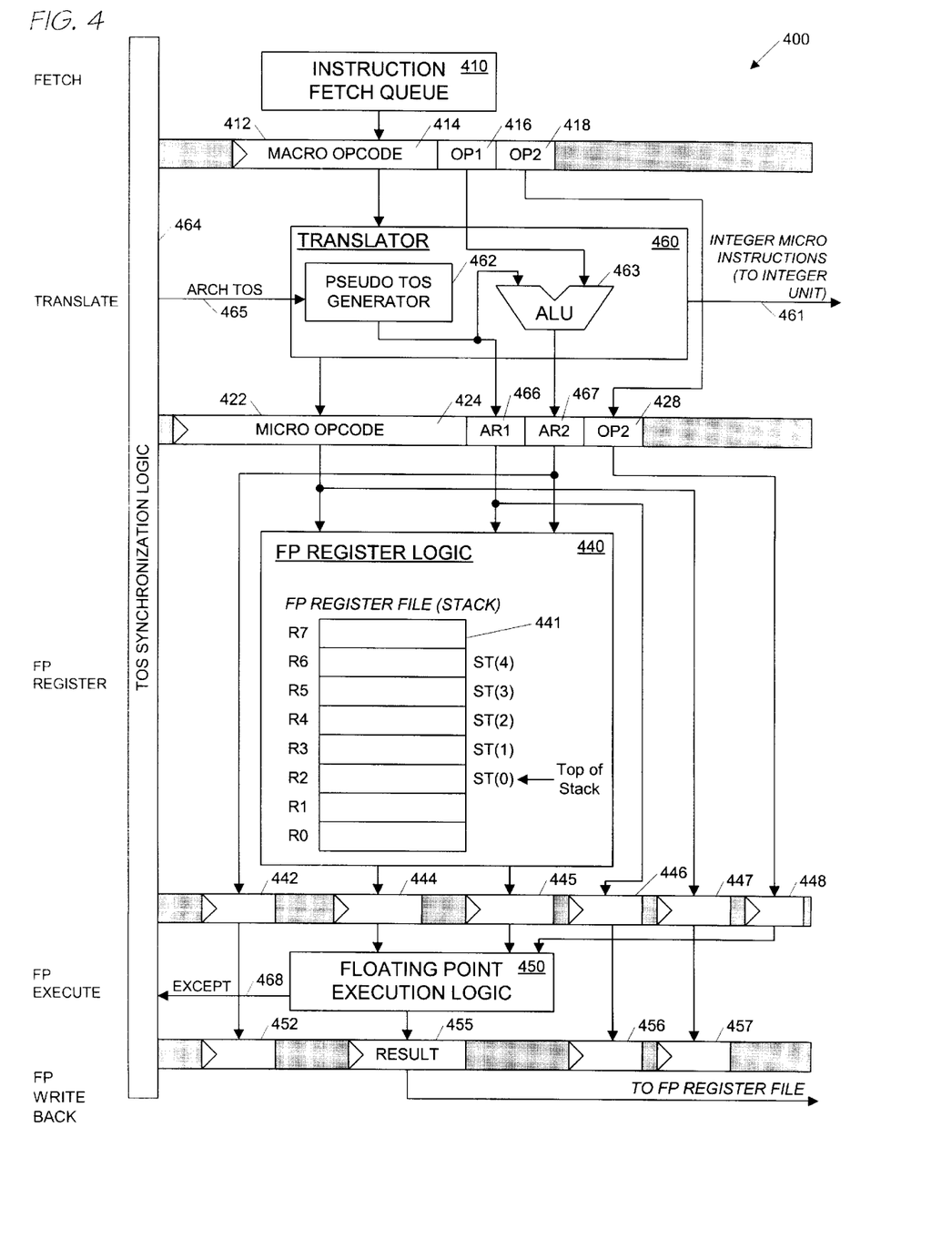
FIG. 4 is a block diagram of a pipeline microprocessor incorporating absolute floating point register addressing according to the present invention.

Now referring to FIG. 4, a block diagram is presented illustrating a portion of a pipeline microprocessor 400 that incorporates an absolute floating point register addressing apparatus according to the present invention. For clarity, integer stages of the microprocessor 400 are not shown. The block diagram shows five pipeline stages associated with execution of a floating point instruction: fetch, translate, floating point register, floating point execute, and floating point write back.

The fetch stage has an instruction fetch queue 410 connected to a macro instruction buffer 412. The translate stage has as translator 460 providing an output to a micro instruction buffer 422. Within the translator 460 is a pseudo top-of-stack generator 462 connected to an offset converter 463. Integer micro instructions are supplied by the translator 460 to an integer unit (not shown) via bus 461. Floating point micro instructions are furnished by the translator to the micro instruction buffer 422. The micro instruction buffer 422 is connected to the floating point register stage. The contents of the micro instruction buffer 422 are provided to floating point register logic 440. Within the floating point register logic 440 is a floating point register file 441. Outputs of the floating point register file 441 are provided to first and second operand registers 444, 445. The floating point execute stage has floating point execution logic 450, which receives inputs from the first and second operand registers 444, 445, along with input from an immediate register 448. The floating point execution logic 450 provides its output to a result register 455. The contents of the result register 455 are provided to the write back stage. Top-of-stack synchronization logic 464 is coupled to each of the stages of the microprocessor 400 and provides architected top-of-stack data, ARCH TOS, to the translator 460 via bus 465.

Operationally, the instruction fetch queue 410 fetches macro instructions from memory (not shown) for execution by the microprocessor 400. The macro instructions are provided sequentially to the macro instruction buffer 412. The macro instruction buffer 412 has three fields: a macro opcode field 414, a first macro operand field 416, and a second macro operand field 418. In the case of a floating point macro instruction, the macro opcode field 414 directs the microprocessor 400 to perform a specified floating point operation. Like the microprocessor 200 of FIG. 2, the macro opcode field 414 implicitly specifies a register in the floating point register file 441, which contains a first operand for the specified floating point operation. The first macro operand field 416 relatively specifies a second register in the floating point register file 441, which contains a second operand for the specified floating point operation. The second macro operand field 418 contains immediate data from memory to be used in the specified floating point operation.

In contrast, though, to the microprocessor 200 of FIG. 2, the translator 460 according to the present invention does not generate floating point micro instructions having relative references to registers in the floating point register file 441. Instead, floating point micro instructions generated by the translator 460 have absolute references to registers within the floating point register file 441. This is accomplished by the pseudo top-of-stack generator 462 and the offset converter 463 in the translate stage prior to supplying the floating point micro instructions to the floating point unit. Upon initialization of the microprocessor 400, the pseudo top-of-stack generator 462 designates a register in the floating point register file 441 as the initial top-of-stack. This designation, in one embodiment of the invention, is compatible with x86 architecture: R0 is designated as the initial top-of-stack register. During ensuing translations, floating point macro instructions having relative references are decoded into associated floating point micro instructions having absolute references. The translator 460 performs this conversion by computing the effect that execution of a given floating point micro instruction will have on the top-of-stack register designation.

If the top-of-stack is initialized to the correct register, and if all subsequent floating point micro instructions properly complete execution through the floating point pipeline, then the floating point register file addresses can be deterministically assigned by the translator 460. But, all floating point micro instructions cannot be expected to properly complete execution in the floating point pipeline. Errors in processing those instructions, or errors caused by processing of integer micro instructions in the parallel integer pipeline, can cause a particular floating point micro instruction to fail to properly execute. In general terms, these cases are known as exceptions. When an exception occurs, the microprocessor 400 flushes the pipeline of all instructions prior to and including the instruction that caused the exception. Following the flush, the next instruction to be executed is the first instruction in an exception handler. The exception handler is a designated set of micro instructions that gracefully handle exceptions. Since the pipeline was flushed as a result of an exception, the current top-of-stack designation in the pseudo top-of-stack generator 462 needs to be set to the architected top-of-stack for the floating point micro instruction associated with the exception. Setting of the pseudo top-of-stack generator 462 is handled by the top-of-stack synchronization logic 464.

As has been described, the translator 460, also known as an instruction decoder 460, translates the floating point macro instruction having relative register references into associated floating point micro instructions having absolute register addresses. The associated floating point micro instructions are sequentially supplied to the micro instruction buffer 422. In one embodiment, the translator is a control read-only memory (ROM). The pseudo top-of-stack generator 463 generates an architected, or predicted, top-of-stack register for each floating point micro instruction by modifying a preceding top-of-stack designation for a preceding floating point micro instruction by the effect that a current floating point micro instruction will have on the top-of-stack. The architected top-of-stack if furnished to subsequent stages of the pipeline as part of the micro opcode field 424. In addition, the pseudo top-of-stack generator 463 generates an absolute address of a first operand and provides it to a first architected register field 466. The absolute address is also supplied to the offset converter 463 for computation of a second register address. The offset converter 463 sums the register address of the first operand with an offset retrieved from the first macro operand field 416 to produce an absolute address of the second register. The absolute address of the second register is supplied in a second architected register field 467. Immediate data are forwarded from a second macro operand field 418 to a second micro operand field 428. In one embodiment, the pseudo top-of-stack generator 462 is a 3-bit register. In another embodiment, the offset converter 463 is a 3-bit ALU.

Thus, the associated floating point micro instructions are provided to the floating point unit of the microprocessor 400. All references to registers in the floating point register file 441 are specified as absolute register addresses. Hence, the registers can be accessed without need for the conversion discussed with respect to FIGS. 2 and 3, thus eliminating the commensurate delay in the pipeline.

In the register stage, the absolute register addresses in fields 466, 467 are provided to the floating point register logic 440 so that the registers can be accessed. If the micro opcode so directs, the contents of the first register and the second register are retrieved and placed into the first and second operand registers 444, 445, respectively. Additionally, the micro opcode, the immediate data, and the first and second architected register addresses are forwarded to registers 447, 448, 446, and 442, respectively.

The floating point execute logic 450 retrieves the contents of the first operand register 444, the contents of the second operand register 445, and the immediate data register 448. The floating point operation directed by the micro opcode is then executed and a result is placed in the result register 455. In addition, the micro opcode is forwarded to register 457, and the first and second architected register addresses are forwarded to registers 456, 452. These the absolute references are provided to write back logic (not shown) so that the contents of the result register 455 can be written back to the proper register in the floating point register file 441.

FIG. 4 also depicts an exception occurring in the floating point execute stage. If a particular floating point micro instruction fails to properly execute in this stage, then the floating point execution logic 450 provides an exception indication, EXCEPT, on bus 468 to the top-of-stack synchronization logic 464. As a result, the top-of-stack synchronization logic 464 retrieves the architected top-of-stack register designation associated with the particular floating point micro instruction and provides it to the translator 460 via bus 465. As the pipeline is flushed, the translator 460 resets the top-of-stack designation in the pseudo top-of-stack generator 462 to the architected register, ARCH TOS, provided via the bus 465. Thus, generation of a top-of-stack register address for a following floating point micro instruction will use the architected top-of-stack provided via the top-of-stack synchronization logic 464.

Generating absolute references for registers in the floating point register file 441 during translation of floating point macro instructions eliminates the reference conversion delays featured for discussion in FIG. 3. This point is more particularly portrayed by FIG. 5.

Figure 5:
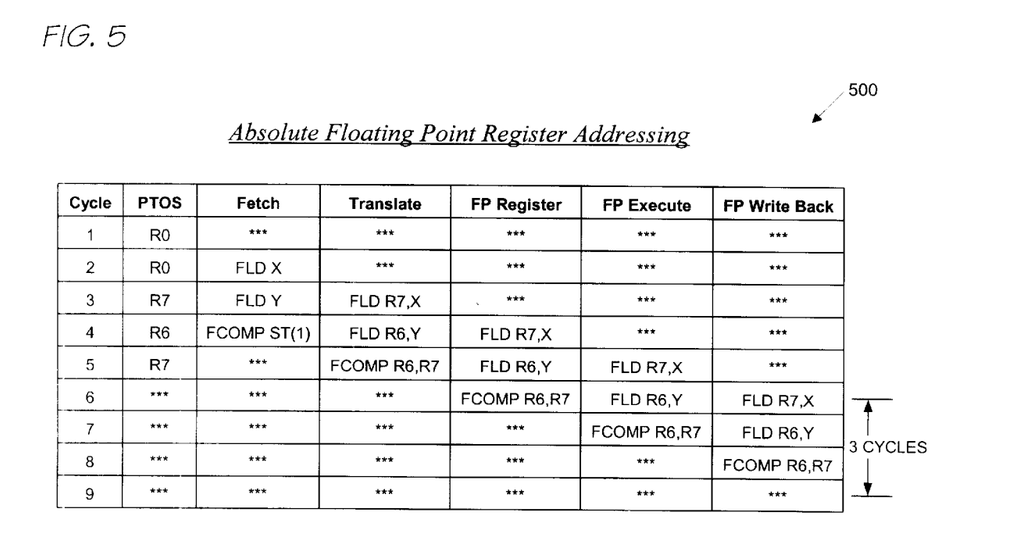
FIG. 5 is a table illustrating the execution of floating point instructions by the microprocessor of FIG. 4.

FIG. 5 is a table 500 illustrating execution of three floating point macro instructions by the microprocessor of FIG. 4. A first floating point macro instruction is designated by FLD X. It directs the microprocessor 400 to load an immediate data entity, X, into the top-of-stack register, ST(0). A second floating point macro instruction is designated by FLD Y. It directs the microprocessor 400 to load a second immediate data entity, Y, into the top-of-stack register, ST(0). A third floating point macro instruction is designated by FCOMP ST(1). It directs the microprocessor 400 to compare the contents of ST(0) with the contents of ST(1), a second register, and to pop the top-of-stack. Progression of the three floating point micro instructions through the microprocessor 400 is shown with respect to cycles of a pipeline clock. Since an architected top-of-stack register is assigned for each instruction, the TOS column in the table 500 shows the top-of-stack register during each cycle of the clock at the point of designation in the translator 460. Instructions before and after instructions of interest are designated by "***."

During cycle 2, FLD X is provided by the instruction fetch queue 410 to the macro instruction buffer 412. The macro opcode, FLD, is placed in the macro opcode field 414 and the immediate data, X, is placed in the second macro operand field 418.

During cycle 3, FLD X proceeds through the translate stage. Therein, it is decoded into a first floating point load micro instruction having absolute references, designated by FLD R7,X. The macro opcode, FLD, is retrieved from the macro opcode field 414 and is provided to the pseudo top-of-stack generator 462. Since it directs the microprocessor 400 to load data in the top-of-stack register, the pseudo top-of-stack generator 462 first decrements the top-of-stack register designation from R0 to R7. Thus, the architected top-of-stack register associated with FLD X is R7. And, R7 is the first architected register operand for FLD X, which is placed in field 466 of the micro instruction buffer 422. Also during cycle 3, the immediate data, X, is forwarded to field 428 and the micro opcode is provided to field 424. The architected top-of-stack register designation is carried along with the micro opcode. Also during cycle 3, FLD Y is supplied by the instruction fetch queue 410 to the macro instruction buffer 412.

During cycle 4, FLD R7,X proceeds through the floating point register stage. Since it specifies a load operation, no data are extracted from the floating point register file 441. Contents of fields 424, 466, and 428 are forwarded to registers 447, 446, and 448, respectively. Also during cycle 4, FLD Y proceeds through the translate stage. Therein, it is decoded into a second floating point load micro instruction having absolute references, designated by FLD R6,Y. The macro opcode, FLD, is retrieved from the macro opcode field 414 and is provided to the pseudo top-of-stack generator 462. Since it directs the microprocessor 400 to load data in the top-of-stack register, the pseudo top-of-stack generator 462 decrements the top-of-stack register designation from R7 to R6. Thus, the architected top-of-stack register associated with FLD Y is R6. And, R6 is the first architected register operand for FLD Y, which is placed in field 466. Also during cycle 4, the immediate data, Y, is forwarded to field 428 and the micro opcode is provided to field 424. The architected top-of-stack register designation is carried along with the micro opcode in field 424. Also during cycle 4, FCOMP ST(1) is provided by the instruction fetch queue 410 to the macro instruction buffer 412.

During cycle 5, FLD R7,X proceeds through the execute stage. Therein, the immediate data, X, is retrieved from register 448 and is provided to the floating point execution logic 450. Because a load operation is directed, the floating point execution logic 450 forwards the immediate data, X, to the result register 455. Contents of registers 446 and 447 are also forwarded to registers 456 and 457, respectively. Also during cycle 5, FLD R6,Y proceeds through the floating point register stage. Since it specifies a load operation, no data are extracted from the floating point register file. Contents of fields 424, 466, and 428 are forwarded to registers 447, 446, and 448, respectively. In addition, during cycle 5, FCOMP ST(1) proceeds through the translate stage. Therein, it is decoded into a floating point compare-and-pop micro instruction, designated by FCOMP R6,R7. Since it directs the microprocessor 400 to compare data in the top-of-stack register with data in a second register offset from the top-of-stack register followed by a pop, the pseudo top-of-stack generator 462 first generates register R7 as an architected top-of-stack register for the micro instruction. The absolute address of the first register for the comparison, R6, is provided to the first architected operand field, 466. R6 is also provided to the offset converter 463, which uses a stack displacement retrieved from field 416 to compute an absolute address of the second register for the comparison. The second absolute address is provided in field 467.

During cycle 6, FLD R7,X proceeds through the write back stage. The immediate data, X, is retrieved from the result register 455 and is stored into the first architected operand register in the floating point register file 441. The micro opcode in register 457 directs the write back logic to perform the load operation and the absolute reference to register R7 is present in register 456. Hence, X is written into register R7. Also during cycle 6, FLD R6,Y proceeds through the execute stage. Therein, the immediate data, Y, is retrieved from register 448 and is provided to the floating point execution logic 450. Because a load operation is directed, the floating point execution logic 450 forwards the immediate data, Y, to the result register 455. Contents of registers 446 and 447 are also forwarded to registers 456 and 457, respectively. In addition, during cycle 6, FCOMP R6,R7 proceeds through the floating point register stage. Therein, contents of registers R6 and R7 are retrieved from the floating point register file 441 and are furnished to first and second operand registers 444, 445. Contents of fields 424, 466, and 467 are also forwarded to registers 447, 446, and 442, respectively.

During cycle 7, FLD R6,Y proceeds through the write back stage. The immediate data, Y, is retrieved from the result register 455 and is loaded into the first architected operand register, R6, in the floating point register file 441. Also during cycle 7, FCOMP R6,R7 proceeds through the execute stage. Therein, contents of the first and second operand registers 444, 445 are provided to the floating point execution logic 450. A comparison is performed which causes certain bits in a flags register (not shown) in the microprocessor 400 to be affected. As was the case for the microprocessor 200 of FIG. 2, the compare operation yields no result in the result register 455 nor is any data written back into the floating point register file 441.

During cycle 8, FCOMP R6,R7 proceeds through the write back stage, thus completing its execution.

As the table 500 illustrates, the generation of absolute register addresses as part of the translation process completely eliminates the delays featured in the discussion with reference to FIG. 3. The three floating point instructions illustrated in FIG. 5 require three cycles to complete execution, thus yielding a three cycle improvement over that of FIG. 3. Elimination of the reference conversion delay by incorporation of the present invention causes notable improvement to the execution time of a software program.

Furthermore, a program containing a significant number of floating point instructions is impacted to even a more favorable degree.

What has been described thus far is an apparatus within a pipeline microprocessor that generates absolute references to registers within a floating point register file as part of the translation process. This allows the floating point unit to immediately fetch operands from the register file. In the event that an exception occurs, synchronization logic resets a top-of-stack pointer in the translate stage to a proper value.

Figure 6:
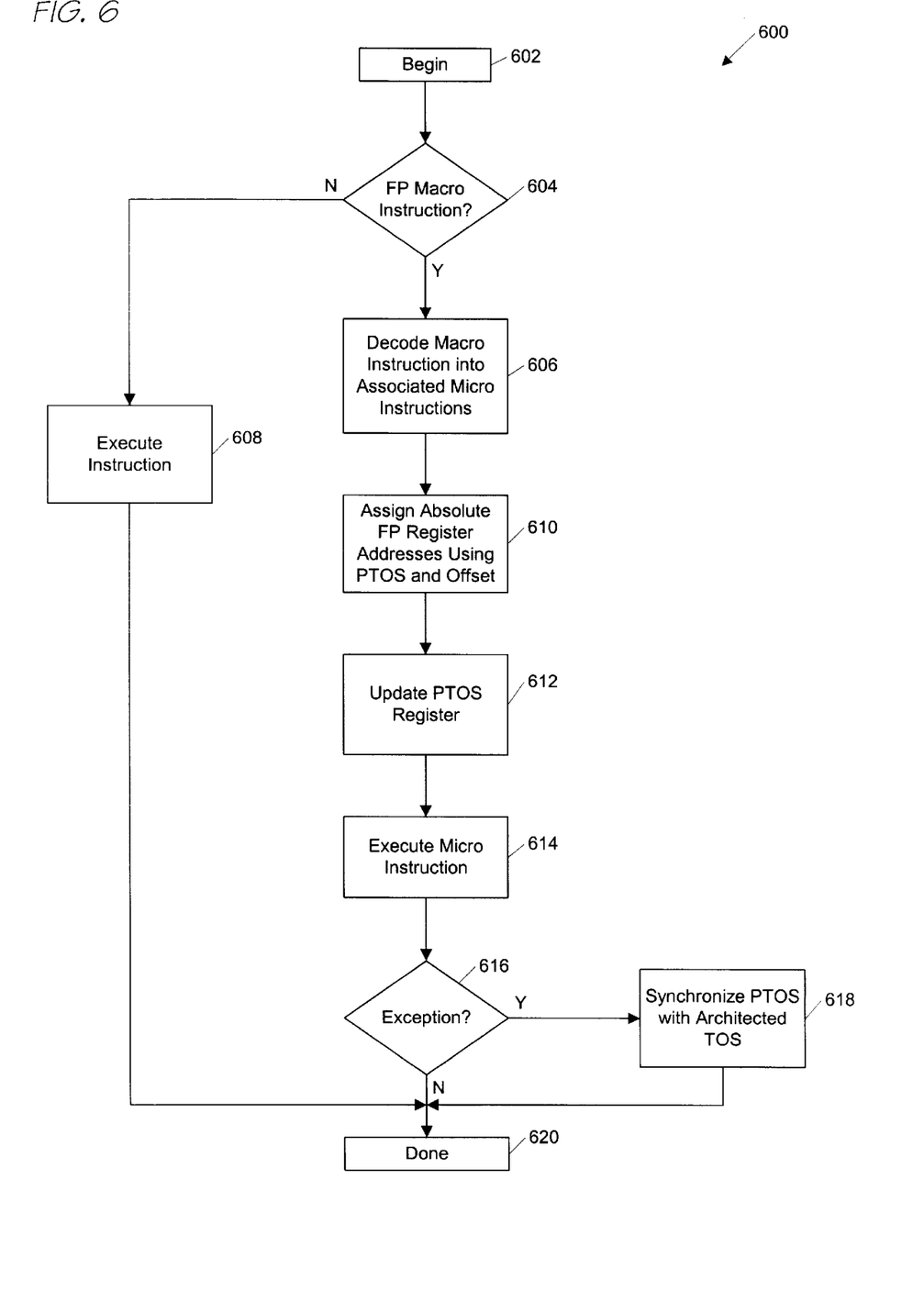
FIG. 6 is a flow chart illustrating the method for absolute floating point register addressing according to the present invention.

Now referring to FIG. 6, a flow chart 600 is presented illustrating the method for absolute floating point register addressing according to the present invention.

Program flow begins at block 602 when a macro instruction is fetched and provided to a translator in a microprocessor. Flow then proceeds to decision block 604.

At decision block 604 a determination is made whether the macro instruction is a floating point macro instruction. If the macro instruction is not a floating point macro instruction, then flow proceeds to block 608. If the macro instruction is a floating point macro instruction, then flow proceeds to block 606.

At block 608, the macro instruction is executed. Flow then proceeds to block 620.

At block 606, the floating point macro instruction is decoded into associated floating point micro instructions, each having an architected top-of-stack register inserted into an associated field. Flow then proceeds to block 610.

At block 610, absolute addresses of prescribed floating point registers are assigned for the associated micro floating point micro instructions. If a given floating point macro instruction prescribes a first operand in a floating point register file, then an absolute register address for the first operand is provided by computing the effect that execution of the given floating point macro instruction will have on a preceding top-of-stack register. This effect is called a top-of-stack displacement. If the given floating point macro instruction prescribes a second operand in the floating point register file, then an offset converter generates a second absolute register address for the second operand by summing the absolute address for the first operand with an offset retrieved from the floating point macro instruction. Flow then proceeds to block 612.

At block 612, a pseudo top-of-stack generator in translation logic is updated to reflect the effect that properly completed execution of the floating point macro instruction will have on the top-of-stack. Hence, a subsequent floating point macro instructions will reference the correct registers in the floating point register file. Flow then proceeds to block 614.

At block 614, the associated floating point micro instructions are sequentially supplied to a floating point unit and executed. Flow then proceeds to decision block 616.

At decision block 616, it is determined whether an exception has occurred. If not, then flow proceeds to block 620. If so, then flow proceeds to block 618.

At block 618, the architected top-of-stack register designation for the particular floating point micro instruction associated with the exception is provided to the translator. The translator then uses this architected top-of-stack register designation as the basis for generation of the top-of-stack for a following micro instruction. Flow then proceeds to block 620.

At block 620, the method completes.

Although the present invention and its objects, features, and advantages have been described in detail, other embodiments are encompassed by the invention. For example, variations on pipeline architecture exist, which combine some stages described in the present invention into a single stage, or separate one of the described stages into two or more stages. In addition, some microprocessors reorder the stages described as needed. The number or order of pipeline stages is not significant to the operation of the present invention. Rather, it is the actual generation of absolute addresses for floating point registers during instruction decode, or prior to formal execution of a floating point instruction, that is of interest.

Moreover, multiple methods may be used to generate the absolute floating point register addresses. Whether the addresses are generated by incrementing/decrementing a register, or with an adder to which is provided a stack displacement, or whether other mechanisms are used to perform the calculation, is unimportant. Furthermore, alternate top-of-stack synchronization mechanisms may be provided. Described herein is an apparatus that spans across several architectural stages of a microprocessor in order to synchronize a pseudo top-of-stack to an architected top-of-stack in the event of an exception. Alternative techniques may be used without departing from the spirit and scope of the present invention.

Furthermore, the pseudo top-of-stack generator and offset converter have been shown to reside within the translator. It is possible that the pseudo top-of-stack generator and offset converter could be moved to be in parallel with the translator, and operated upon concurrent with instruction translation without departing from the scope of the present invention.

The present invention has been described with reference to floating point unit in a microprocessor. However, it is entirely within the scope of this invention for the floating point unit to be part of any other type of digital logic device such as digital signal processor, a numeric processor, or the like.

Furthermore, future improvements to processing systems may allow referencing of more than two operands within a single macro instruction to registers in a floating point register file. The present invention anticipates such improvements.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor, for executing a floating point macro instruction having relative references to registers within a floating point register file, the microprocessor comprising:

translation logic, configured to translate the floating point macro instruction into associated floating point micro instructions, wherein said associated floating point micro instructions have absolute references to the registers within the floating point register file, said translation logic comprising:

a pseudo top-of-stack generator, configured to generate an absolute reference to a top-of-stack register for each of said associated floating point micro instructions; and an offset converter, coupled to said pseudo top-of-stack generator, configured to compute a second absolute reference to a second register within the floating point register file; and top-of-stack synchronization logic, coupled to said translation logic, configured to synchronize said pseudo top-of-stack generator with an architected top-of-stack register.

2. The microprocessor as recited in claim 1, wherein the microprocessor is a pipeline microprocessor having a floating point unit.

3. The microprocessor as recited in claim 1, wherein said absolute references specify physical register addresses in the floating point register file.

4. The microprocessor as recited in claim 1, wherein said pseudo top-of-stack generator generates a particular absolute reference to a particular top-of-stack register for a particular floating point micro instruction within said associated floating point micro instructions using a preceding absolute reference to a preceding top-of-stack register for a preceding floating point micro instruction.

5. The microprocessor as recited in claim 4, wherein said pseudo top-of-stack generator generates said particular absolute reference according to an effect that execution of said particular floating point micro instruction will have on the floating point register file.

6. The microprocessor as recited in claim 1, wherein said offset converter is a 3-bit ALU.

7. The microprocessor as recited in claim 1, wherein said offset converter computes said second absolute reference to said second register by summing a particular absolute reference to a particular top-of-stack register for a particular floating point macro instruction to an offset operand prescribed by said particular floating point macro instruction, said particular absolute reference being generated by said pseudo top-of-stack generator.

8. The microprocessor as recited in claim 1, wherein, when an exception occurs during the execution of one of said associated floating point micro instructions, said top-of-stack synchronization logic provides said architected top-of-stack register, wherein said architected top-of-stack register comprises a top-of-stack register corresponding to successful execution of said one of said associated floating point micro instructions.

9. The microprocessor as recited in claim 8, wherein, if said one of said associated floating point micro instructions fails to properly complete execution, then said top-of-stack synchronization logic provides said architected top-of-stack register to said pseudo top-of-stack generator and said pseudo top-of-stack generator resets said absolute reference to point to said architected top-of-stack register so that a following top-of-stack reference in a following micro instruction will be generated using said architected top-of-stack register.

10. An apparatus within a pipeline microprocessor, for executing a floating point macro instruction having relative references to registers within a floating point register file, the apparatus comprising:

an instruction decoder, configured to translate the floating point macro instruction into associated floating point micro instructions, wherein each of said associated floating point micro instructions has an absolute reference to a top-of-stack register within the floating point register file, said instruction decoder comprising:

a pseudo top-of-stack generator, configured to generate said absolute reference to said top-of-stack register for said each of said associated floating point micro instructions; and an offset converter, coupled to said pseudo top-of-stack generator, configured to compute a second absolute reference to a second register within the floating point register file;

a floating point unit, coupled to said instruction decoder, for executing said each of said associated floating point micro instructions, and for maintaining an architected top-of-stack register for said each of said associated floating point micro instructions; and top-of-stack synchronization logic, coupled to said instruction decoder and said floating point unit, configured to synchronize said pseudo top-of-stack generator with said architected top-of-stack register.

11. The apparatus within a pipeline microprocessor as recited in claim 10, wherein said pseudo top-of-stack generator generates a particular absolute reference to a particular top-of-stack register for a particular floating point micro instruction within said associated floating point micro instructions using a preceding absolute reference to a preceding top-of-stack register for a preceding floating point micro instruction.

12. The apparatus within a pipeline microprocessor as recited in claim 10, wherein said offset converter computes said second absolute reference to said second register by summing a particular absolute reference to a particular top-of-stack register for a particular floating point macro instruction to an offset operand prescribed by said particular floating point macro instruction, said particular absolute reference being generated by said pseudo top-of-stack generator.

13. The apparatus within a pipeline microprocessor as recited in claim 10, wherein, when an exception occurs during the execution of one of said associated floating point micro instructions, said top-of-stack synchronization logic provides said architected top-of-stack register, wherein said architected top-of-stack register comprises a top-of-stack register corresponding to successful execution of said one of said associated floating point micro instructions.

14. A microprocessor for executing a floating point macro instruction that specifies operands in a floating point register file within registers prescribed relative to a floating point top-of-stack register, the microprocessor comprising:

a translator, for decoding the floating point macro instruction into associated floating point micro instructions, said translator comprising:

a pseudo top-of-stack pointer, for providing an absolute floating point top-of-stack address for a specific floating point micro instruction, said specific floating point micro instruction being one of said associated micro instructions;

wherein said translator specifies absolute addresses of the registers in the floating point register file within said associated floating point micro instructions.

15. The microprocessor as recited in claim 14, wherein said pseudo top-of-stack pointer derives said absolute floating point top-of-stack address from a preceding absolute floating point top-of-stack address associated with a preceding floating point micro instruction.

16. The microprocessor as recited in claim 15, wherein said pseudo top-of-stack pointer provides said absolute floating point top-of-stack address according to what effect execution of said specific floating point micro instruction will have on the floating point register file.

17. The microprocessor as recited in claim 14, further comprising:

top-of-stack synchronization logic, coupled to said translator, for synchronizing said pseudo top-of-stack pointer with an architected top-of-stack address, wherein said architected top-of-stack address comprises said absolute floating point top-of-stack address for said specific floating point micro instruction, if said specific floating point micro instruction fails to properly complete execution.

18. The microprocessor as recited in claim 14, wherein said translator further comprises:

an offset converter, coupled to said pseudo top-of-stack generator, configured to compute a second absolute register address for a particular floating point micro instruction requiring access to a second register within the floating point register file, the particular floating point micro instruction being one of said associated micro instructions;

wherein said offset converter computes said second absolute register address by summing said absolute floating point top-of-stack address with a relative offset provided by the floating point macro instruction.

19. A floating point micro instruction within a pipeline microprocessor, the floating point micro instruction being generated in a translate stage of the pipeline microprocessor prior to transmission to a floating point unit, the floating point micro instruction comprising:

a micro opcode field, configured to direct the pipeline microprocessor to perform a specified floating point operation;

a top-of-stack field, coupled to said micro opcode field, prescribing an absolute address of a top-of-stack register within a floating point register file; and a second operand field, coupled to said top-of stack field, prescribing a second absolute address of a second register within said floating point register file;

wherein said top-of-stack field and said second operand field are calculated within the translate stage from a floating point macro instruction that prescribes a floating point operation to be executed relative to a current top-of-stack register within said floating point register file.

20. The floating point micro instruction as recited in claim 19, wherein said absolute address of said top-of-stack register is calculated by summing a preceding absolute address of a preceding top-of-stack register with a stack displacement associated with said specified floating point operation.

21. The floating point micro instruction as recited in claim 20, wherein said stack displacement is determined based upon the floating point micro instruction properly completing execution.

22. The floating point micro instruction as recited in claim 19, wherein said second absolute address to said second register is calculated by adding said absolute address of said top-of-stack register to a relative offset provided by an associated floating point macro instruction.

23. A method for absolutely addressing registers in a floating point register file, the method comprising:

a) within a translator, generating an absolute address of a top-of-stack register in the floating point register file for a particular floating point macro instruction using a preceding absolute top-of-stack address and a stack displacement;

b) if access to a second register in the floating point register file is required by the particular floating point macro instruction, generating a second absolute address of the second register using the absolute address of the top-of-stack register and an offset retrieved from the floating point macro instruction;

c) decoding the floating point macro instruction into associated floating point micro instructions, to be executed by a floating point unit, and inserting the absolute addresses generated in a) and b) into those associated floating point micro instructions that require access to the registers; and d) executing the associated floating point micro instructions within the floating point unit, wherein, if one of the floating point micro instructions fails to properly execute, resetting a pseudo top-of-stack generator in the translator to the absolute address of the top-of-stack register corresponding to the one of the floating point micro instructions.

24. The method for absolutely addressing registers in a floating point register file as recited in claim 23, wherein said generating in b) comprises summing the absolute address and the offset retrieved from the floating point macro instruction, within an offset converter.

25. The method for absolutely addressing registers in a floating point register file as recited in claim 23, wherein c) is performed prior to said executing within the floating point unit.

* * * * *